(12) United States Patent
Koga et al.

(10) Patent No.: US 12,508,918 B2
(45) Date of Patent: Dec. 30, 2025

(54) ELECTRIC WORK MACHINE

(71) Applicant: KOBELCO CONSTRUCTION MACHINERY CO., LTD., Hiroshima (JP)

(72) Inventors: Nobuhiro Koga, Hiroshima (JP); Kazuki Tamiya, Hiroshima (JP); Nobuya Sakaguchi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 874 days.

(21) Appl. No.: 17/664,070

(22) Filed: May 19, 2022

(65) Prior Publication Data
US 2022/0402369 A1 Dec. 22, 2022

(30) Foreign Application Priority Data

Jun. 18, 2021 (JP) ................. 2021-101732

(51) Int. Cl.
| | |
|---|---|
| *B60L 9/00* | (2019.01) |
| *B60M 7/00* | (2006.01) |
| *E02F 9/08* | (2006.01) |
| *E02F 9/18* | (2006.01) |
| *E02F 9/20* | (2006.01) |
| *E02F 9/22* | (2006.01) |

(52) U.S. Cl.
CPC ............. *B60L 9/00* (2013.01); *B60M 7/00* (2013.01); *E02F 9/0858* (2013.01); *E02F 9/0866* (2013.01); *E02F 9/18* (2013.01); *E02F 9/207* (2013.01); *E02F 9/22* (2013.01); *B60L 2200/40* (2013.01); *E02F 9/2058* (2013.01)

(58) Field of Classification Search
CPC ......... B60L 9/00; B60L 2200/40; B60M 7/00; E02F 9/0858; E02F 9/0866; E02F 9/18; E02F 9/207; E02F 9/22; E02F 9/2058

USPC ................. 191/12 R, 12.4, 12.2 A
See application file for complete search history.

(56) References Cited

U.S. PATENT DOCUMENTS

| | | | |
|---|---|---|---|
| 3,632,906 A | 1/1972 | Aihara | |
| 2024/0026641 A1* | 1/2024 | Morikawa | E02F 9/0808 |

FOREIGN PATENT DOCUMENTS

| | | | |
|---|---|---|---|
| JP | 2004-84328 A | | 3/2004 |
| JP | 2004225355 A | * | 8/2004 |
| JP | 2005-054365 A | | 3/2005 |

OTHER PUBLICATIONS

Extended European Search Report issued Nov. 25, 2022 in European Patent Application No. 22175312.2, citing references 1 and 15-16 therein, 7 pages.

* cited by examiner

*Primary Examiner* — S. Joseph Morano
*Assistant Examiner* — Heaven R Buffington
(74) *Attorney, Agent, or Firm* — Oblon, McClelland, Maier & Neustadt, L.L.P.

(57) ABSTRACT

Provided is an electric work machine powerable by an external power supply through a power supply cable. The electric work machine includes a machine body including an electric motor, a power receiving device supplied with power through the power feed cable, connection wires extending from the power receiving device, a power feed cable connected to the machine body and a connection unit. The connection unit is disposed outside the power receiving device and connects the power feed cable and the connection wires to each other.

9 Claims, 7 Drawing Sheets

ELECTRIC WORK MACHINE

TECHNICAL FIELD

The present invention relates to an electric work machine.

BACKGROUND ART

A work machine such as a hydraulic excavator includes a crawler type of lower traveling body, an upper slewing body mounted on the lower traveling body capably of slewing, a work attachment attached to the upper slewing body to make a working motion, and a driving source mounted on the upper slewing body. As such a work machine, an electric work machine is known including an electric motor as the driving source.

An electric work machine is powered through a power supply cable. The power supply cable has a power-supply side end to be connected to an external power supply, and a machine side end to be connected to the upper slewing body on the opposite side to the power-supply side. The upper slewing body is provided with, for example, a slip ring as described in Japanese Patent Application Publication No. 2005-54365. The slip ring constitutes a power receiving device of the upper slewing body, enabling the power supply cable to be connected to the upper slewing body with no entanglement with the electric work machine due to the slewing of the upper slewing body.

The electric work machine described in Japanese Patent Application Publication 2005-54365 includes a connection unit where a power feed cable and the slip ring is connected to each other, the connection unit located on the top of the power receiving device. This causes the connection between the slip ring and the power feed cable to require drawing the power feed cable into the power receiving device of the upper slewing body and performing a connection work inside the power receiving device. The connection unit, located at a position difficult for a worker to access, causes the connection work to include many man-hours and to be extremely complicated.

SUMMARY OF INVENTION

An object of the present invention is to provide an electric work machine including a machine body and a power receiving device and allowing connection work for interconnecting the power receiving device and a power feed cable that enables the machine body to be fed with power through the power feed cable to be efficiently performed.

Provided is an electric work machine powerable through a power supply cable having a power-supply side end to be connected to an external power supply and a machine side end opposite to the power-supply side end. The electric work machine includes a machine body, a power receiving device, connection wires, a power feed cable and a connection unit. The machine body includes an electric motor. The power receiving device is connected to the machine side end of the power supply cable to be supplied with power by the external power supply through the power supply cable. The connection wires are connected to the power receiving device to extend from the power receiving device toward the connection unit. The power feed cable is connected to the machine body to allow the machine body to be fed with power through the power feed cable. The connection unit is disposed outside the power receiving device and connects the connection wires extending from the power receiving device and the power feed cable extending from the machine body to each other.

DESCRIPTION OF EMBODIMENTS

Below will be described embodiments of the present invention with reference to the drawings. The following description about the preferred embodiments is just illustrative with no intention to limit the present invention, the application thereof or the use thereof.

Figure 1:
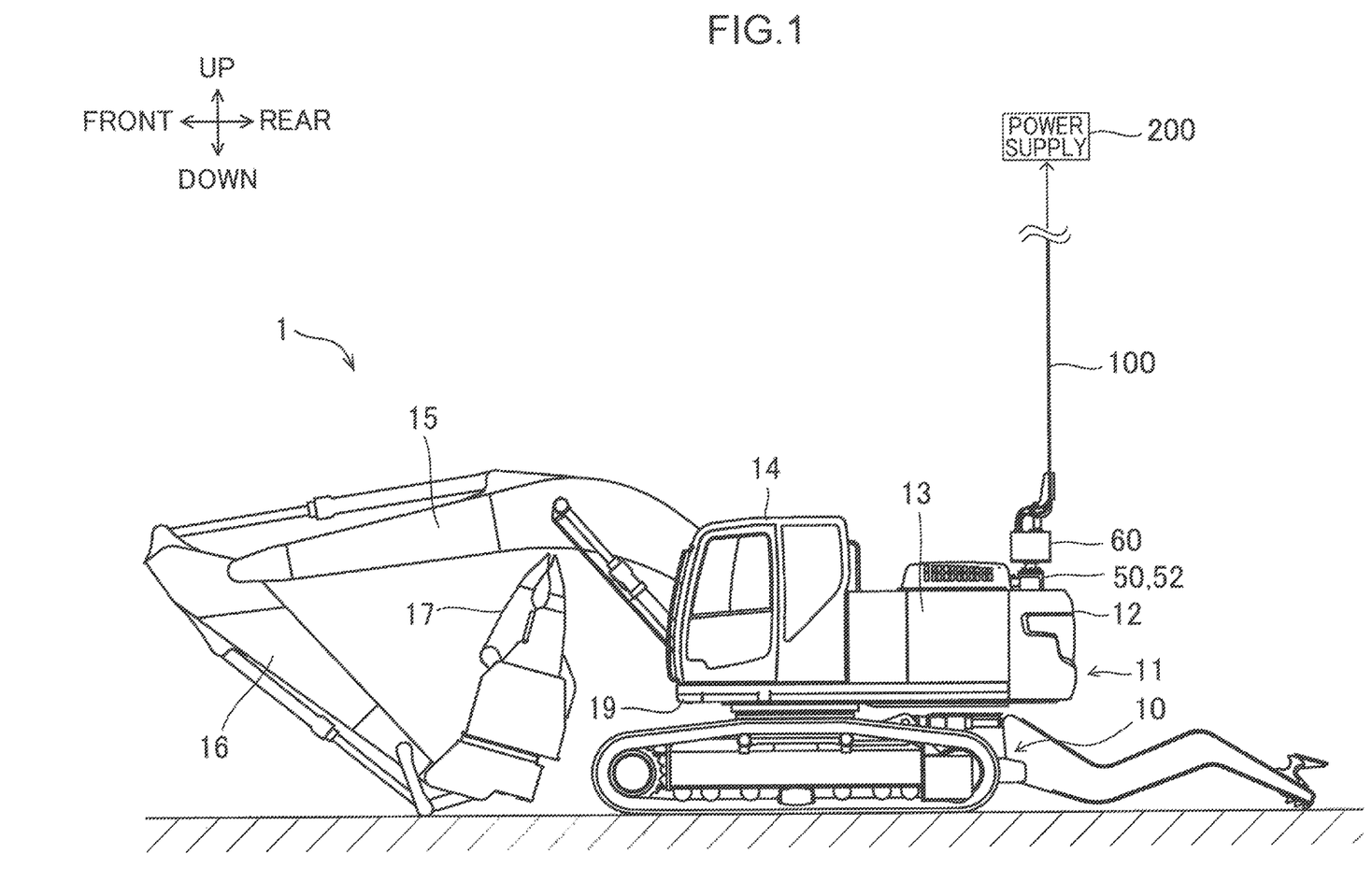
FIG. 1 is a side view of an electric work machine according to an embodiment of the present invention.

FIG. 1 shows an electric hydraulic excavator 1. The hydraulic excavator 1 is an example of the electric work machine according to the present invention.

The hydraulic excavator 1 includes a crawler type of lower traveling body 10, an upper slewing body 11 mounted on the lower traveling body 10 capably of slewing, a power receiving device 60, a plurality of connection wires 61, a power feed cable 40, and a connection box 50. The upper slewing body 11 corresponds to the machine body according to the present invention. The machine body according to the present invention may be either the lower traveling body 10.

The machine body, namely, the upper slewing body 11 according to the present embodiment, is connectable to an external power supply 200 through a power supply cable 100, and the electric hydraulic excavator 1 can be actuated by supply of power from the external power supply 200 to the upper slewing body 11 through the power supply cable 100. The power supply cable 100 has a power-supply side end to be connected to the external power supply 200 and a machine side end opposite to the power-supply side end, the machine side end being connectable to the machine body, which is the upper slewing body 11 in the present embodiment.

The upper slewing body 11 includes a slewing frame 19, a counterweight 12, a machine room 13, a cab 14, a work device 18, a machine room cover, an electric motor 20, and a hydraulic pump 30.

The slewing frame 19 is connected to the lower traveling body 10 capably of slewing about a vertical axis relatively to the lower traveling body 10. The counterweight 12 is disposed on the slewing frame 19 and located in the rear of the upper slewing body 11. The machine room 13 is disposed on the slewing frame 19 and located on the front side of the counterweight 12. The cab 14 is disposed on the slewing frame 19 and located frontward of the machine room 13.

The work device 18 is adjacent to the cab 14 laterally of the upper slewing body 11, configured to perform a predetermined working motion, that is, an excavation motion and the like in this embodiment. The work device 18 includes a boom 15, an arm 16 and a work attachment 17. The boom 15 has a proximal end and a distal end opposite to the proximal end, the proximal end being mounted on the front end of the slewing frame 19 capably of vertically swinging to the slewing frame 19. The arm 16 has a proximal end and a distal end opposite thereto, the proximal end being connected to the distal end of the boom 15 capably of vertically rotational movement. The work attachment 17 is attached to the distal end of the arm 16.

Figure 2:
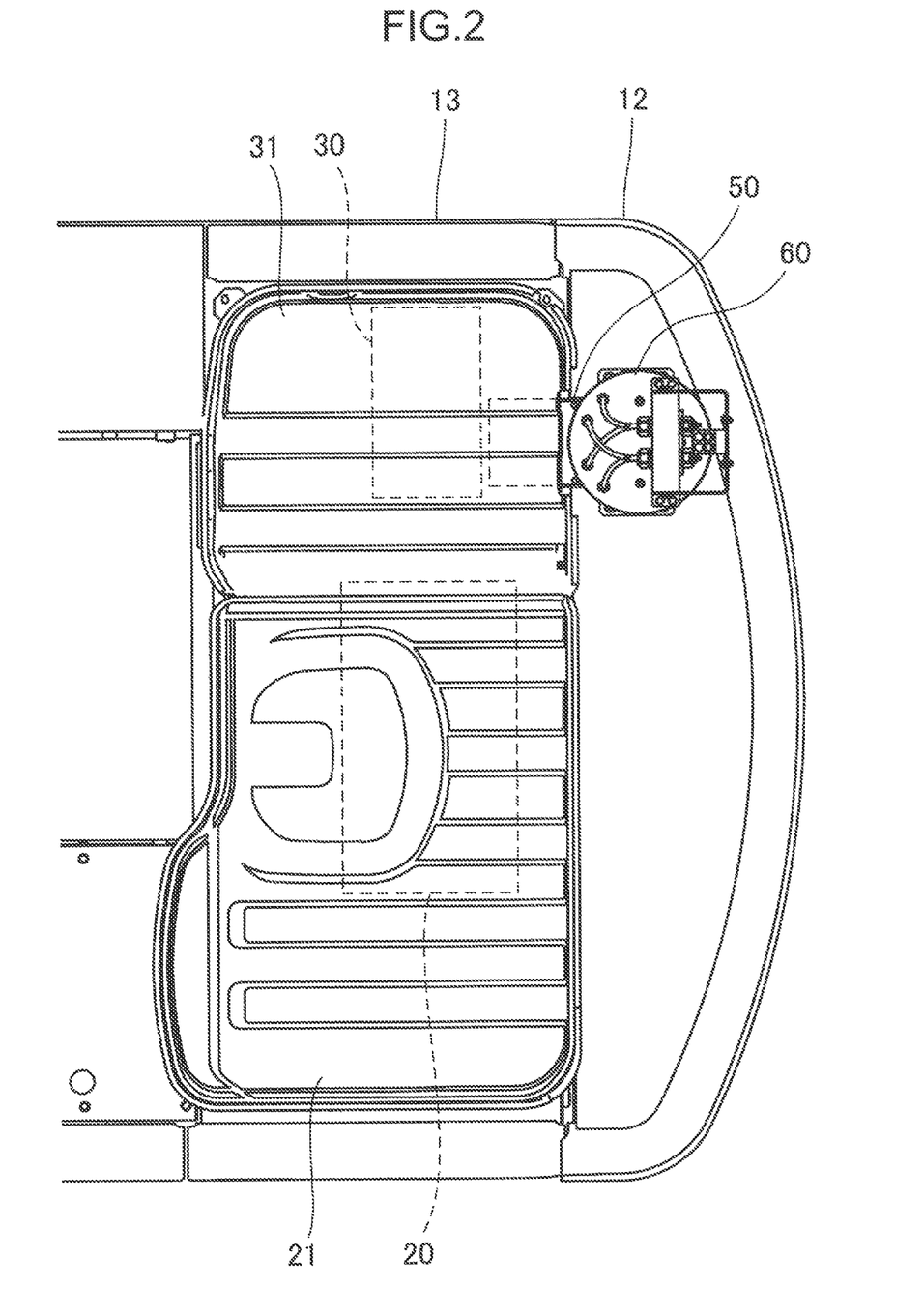
FIG. 2 is a plan view of a rear part of the machine body of the electric work machine.

The machine room cover includes an electric motor cover 21 and a hydraulic pump cover 31 shown in FIG. 2, covering the machine room 13 from above. The machine room 13 accommodates the electric motor 20 and the hydraulic pump 30. The electric motor 20 is the driving source of the electric hydraulic excavator 1, being powered to drive the hydraulic pump 30. The hydraulic pump 30 is aligned laterally with the electric motor 20 and configured to be driven by the electric motor 20 to thereby discharge hydraulic fluid. The electric motor cover 21 is disposed so as to cover the electric motor 20 from above and capably of opening and closing. Specifically, the electric motor cover 21 has a front end and a rear end, the front end being capable of vertically rotational movement about the rear end to allow the electric motor cover 21 to be moved between a closing position and an opening position. The electric motor cover 21 can be pulled up from the closing position to the opening position, thereby opening the electric motor 20 and peripheral devices thereof accommodated in the machine room 13 to allow the maintenance thereof to be performed.

Figure 3:
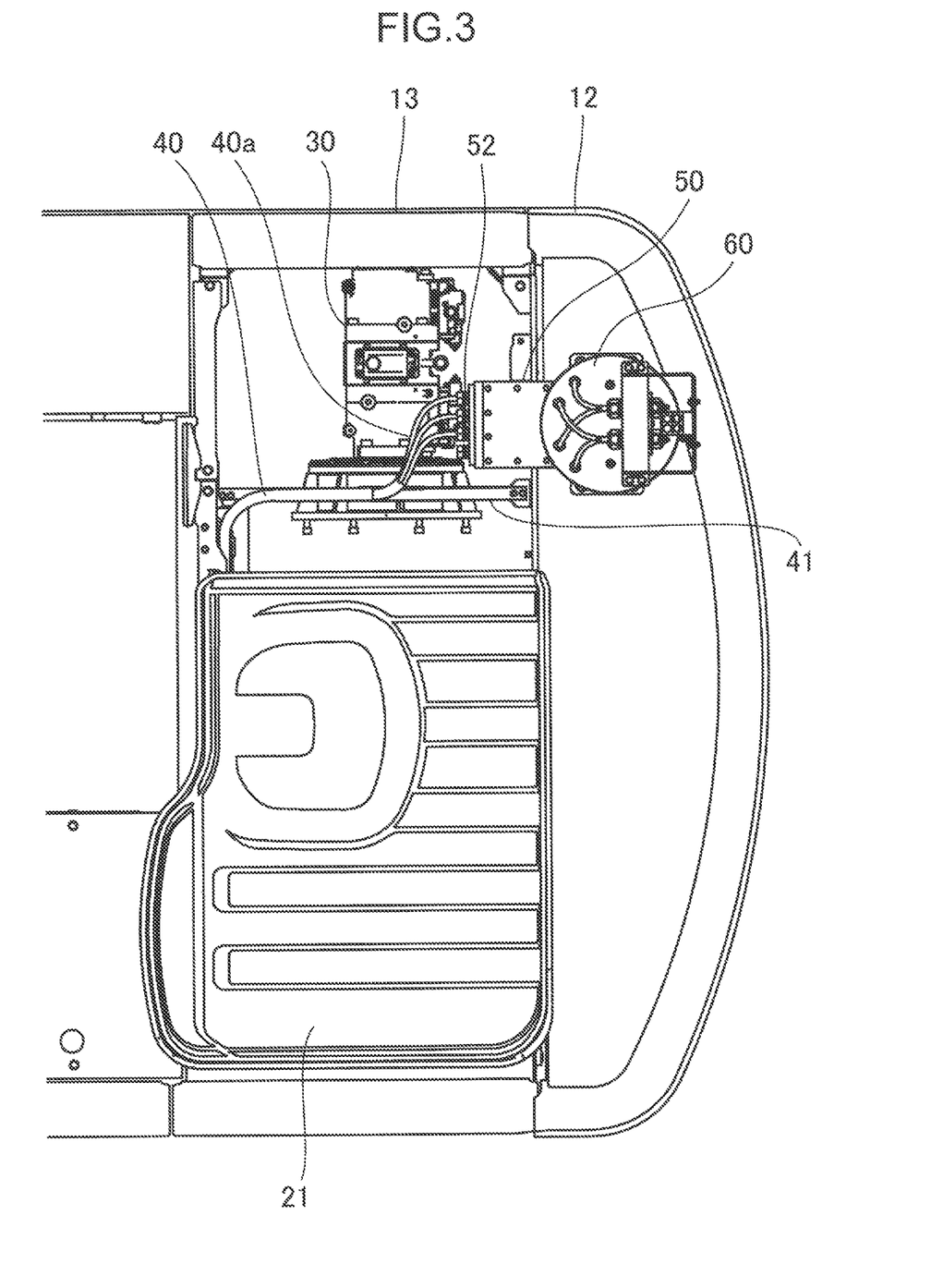
FIG. 3 is a plan view showing the rear of the machine body from which a hydraulic pump cover is removed.

The hydraulic pump cover 31 is disposed so as to cover the hydraulic pump 30 from above and capably of opening and closing. Specifically, the hydraulic pump cover 31 is capable of rotational movement between a closing position and an opening position, configured to open the hydraulic pump cover 31 upward as shown in FIG. 3 in the opening position to thereby allow the maintenance of the hydraulic pump 30 and peripheral devices accommodated in the machine room 13 to be performed. This state involves exposure of the electric motor 20, the power feed cable 40 for powering a not-graphically-shown control panel, the hydraulic pump 30 and a part of the connection box 50.

The power feed cable 40 is connected to the machine body to allow the machine body to be fed with power through the power feed cable 40. Specifically, the power feed cable 40 is connected to the electric motor 20 in the machine room 13 and drawn from the electric motor 20 upward of the position between the electric motor 20 and the hydraulic pump 30.

Figure 4:
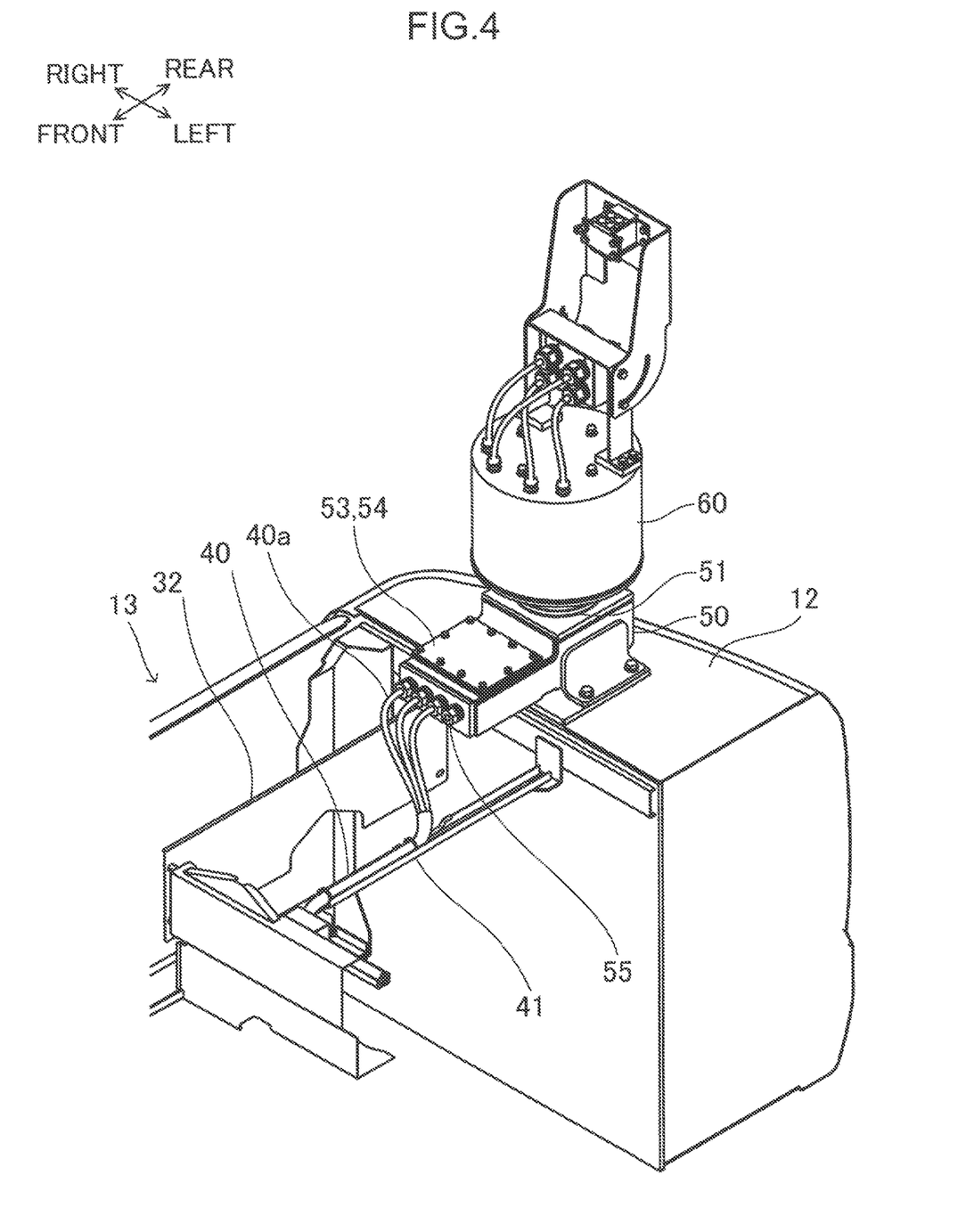
FIG. 4 is a perspective view showing the interior of a machine room of the electric work machine from which a hydraulic pump is removed.

In the machine room 13 are provided a fire plate 32 and a beam member 41 shown in FIG. 4. The fire plate 32 is formed in a flat plate shape, located over the hydraulic pump 30 inside the machine room 13 and constructed longitudinally of the upper slewing body 11 to shield the hydraulic pump 30 from the high-temperature part of the electric motor 20. The beam member 41 is located above the hydraulic pump 30 which is closer to the electric motor 20 than the fire plate 32, having a rod shape extending longitudinally of the upper slewing body 11.

The power feed cable 40 includes a plurality of electric wires 40a which are bundled with each other, being wired rearward from the front of the upper slewing body 11 along the beam member 41. The plurality of electric wires 40a are separated from each other at the rear of the power feed cable 40 and drawn into the connection box 50 independently of each other.

Figure 5:
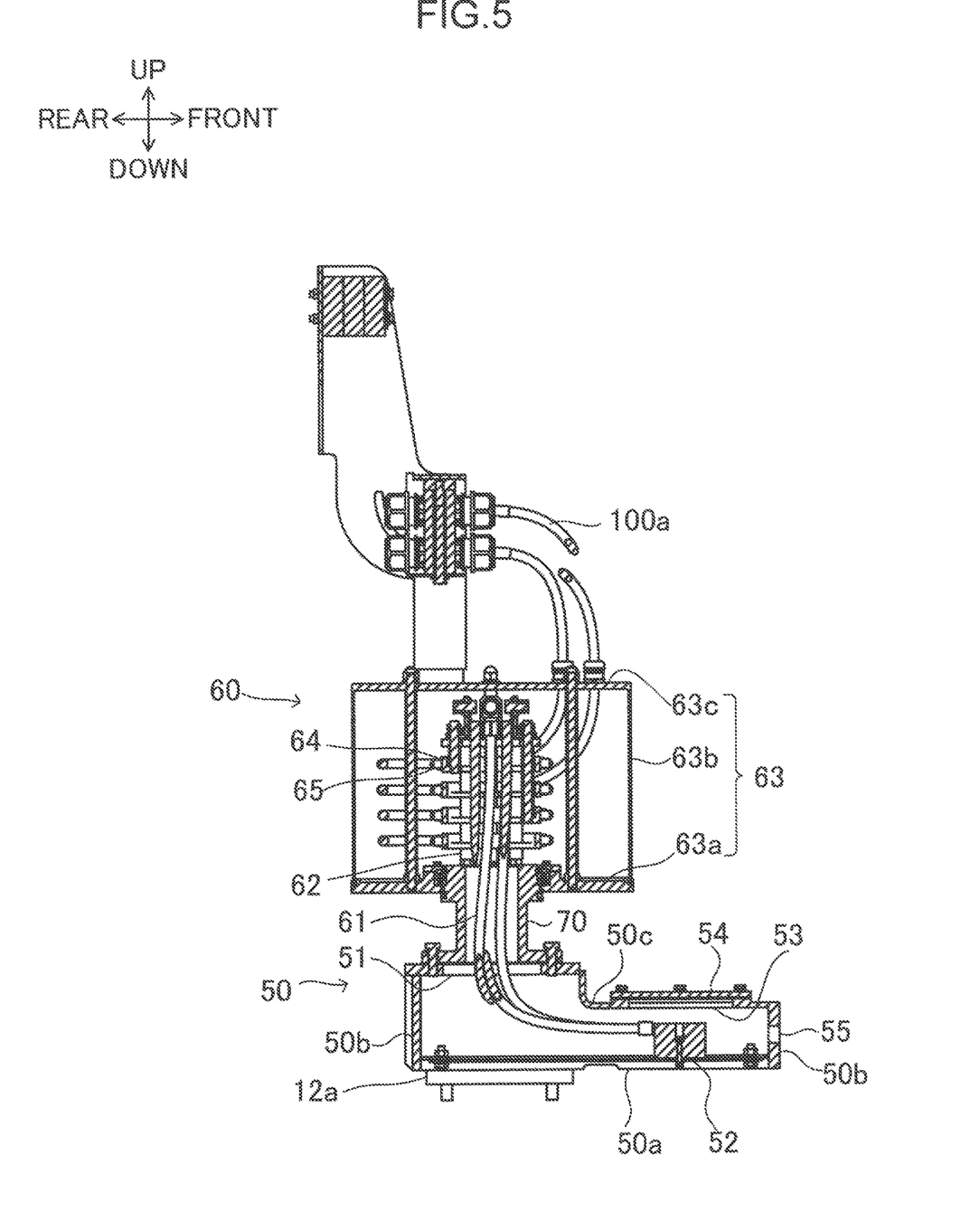
FIG. 5 is a longitudinal sectional view of a power receiving device and a connection box of the electric work machine.

As shown in FIG. 5, the power receiving device 60 can be connected to the machine side end of the power supply cable 100 to be supplied with power by the external power supply 200 through the power supply cable 100. The plurality of connection wires 61 are wirable so as to extend from the power receiving device 60 toward the connection box 50, that is, downward in this embodiment.

The connection box 50 accommodates a connection unit 52. The connection unit 52 is a unit for interconnecting the connection wires 61 extending from the power receiving device 60 and the power feed cable 40 extending from the upper slewing body 11 (specifically, from the electric motor 20 in this embodiment). The connection unit 52 is, thus, disposed outside the power receiving device 60. The connection box 50 extends longitudinally of the upper stewing body 11 as shown in FIG. 5 and encloses an inner space, in which the connection unit 52 is disposed.

The connection box 50 has a rear part and a front part. The rear part is fixed to the upper part of the counterweight 12, specifically, the upper surface of the counterweight 12. The front part extends from the rear part forward toward the hydraulic pump cover 31 beyond the front surface of the counterweight 12. The end of the front part, namely, the front end of the connection box 50, is located under the hydraulic pump cover 31 and at rear side of the hydraulic pump 30, thereby enabling the interior of the connection box 50 to be protected with no reduction in the maintainability of the hydraulic pump 30.

The connection box 50 includes a bottom wall 50a, a peripheral wall 50b, and a top wall 50c, which walls constitute a box body. The bottom wall 50a has a substantially rectangular shape in plan view in this embodiment, disposed along the upper surface of the counterweight 12. The bottom wall 50a is fixed to the upper surface of the counterweight 12 through the fixing member 12a. The fixing member 12a has a shape of substantially rectangular flat plate, being screwed to the lower surface of the bottom wall 50a while fixed to the upper surface of the counterweight 12. The connection unit 52 is fixed to the upper surface of the front part, that is, the right part in FIG. 5, of the bottom wall 50a. The peripheral wall 50b stands up from the periphery of the bottom wall 50a to enclose the inner space. The top wall 50c is disposed so as to cover the inner space on the upper side of the inner space and joined with the upper end of the peripheral wall 50b.

The top wall 50c is formed with a wiring opening 51 and a connection opening 53, which are spaced longitudinally of the upper slewing body 11.

The wiring opening 51 is formed at a position on the rear side of the connection opening 53 to allow the plurality of connection wires 61 to be drawn from the power receiving device 60 located above the connection box 50 into the connection box 50 through the wiring opening 51. The power receiving device 60 is connected to the top wall 50c of the connection box 50 through a cylindrical connection member 70 shown in FIG. 5. The connection member 70 includes an upper end to be connected to the power receiving device 60 and a lower end to be connected to the top wall 50c, the lower end being fixed to the rear part of the top wall 50c, in detail, the peripheral part of the wiring opening 51, by screws or the like. The connection member 70 allows the plurality of connection wires 61 to be drawn into the connection box 50 from the power receiving device 60 through the connection member 70 and the wiring opening 51 to be connected to the connection unit 52.

The connection of the power receiving device 60 to the upper surface of the rear part of the connection box 50 causes the hydraulic pump cover 31, the connection unit 52 in the connection box 50 and the power receiving device 60 to be arranged in this order. This arrangement allows the connection wires 61 drawn into the interior of the connection box 50 from the power receiving device 60 and the power feed cable 40 drawn from the connection box 50 into the hydraulic pump cover 31 to be arranged so as to extend longitudinally of the upper slewing body 11 to thereby allow the arrangement to be easily performed.

The connection opening 53 is formed at a position on the front side of the wiring opening 51, more preferably, formed at a position on the front side of the power receiving device 60 so as not to overlap vertically with the power receiving device 60. The connection opening 53 is opened upward so as to allow the connection unit 52 to be opened upward of the connection box 50 through the connection opening 53. The top wall 50c has an intermediate part longitudinally thereof, the intermediate part being given a step, which renders the front part formed with the connection opening 53 lower than the rear part formed with the wiring opening 51, out of the top wall 50c.

The connection box 50 further includes a lid part 54 in addition to the box body. The lid part 54 is detachably attached to the top wall 50c to close the connection opening 53. The lid part 54, when removed from the top wall 50c, opens the connection opening 53 to thereby allow the connection unit 52 to be exposed upward through the connection opening 53, thereby enabling the connection work of connecting the power feed cable 40 and the plurality of connection wires 61 in the connection unit 52 to each other through the connection opening 53 to be easily performed. Furthermore, the arrangement of the connection opening 53 to overlap at least a part of, preferably a whole of, the connection opening 53 with the connection unit 52 renders the connection work easier. On the other hand, when the connection work is not performed, the lid part 54 is attached to the top wall 50c to close the connection opening 53, thereby protecting the connection unit 52 effectively.

The connection box 50 is formed with a plurality of power-feed-cable lead-in ports 55, which are formed in a part of the peripheral wall 50b, the part forming the front end of the connection box 50. The plurality of power-feed-cable lead-in ports 55, in this embodiment, are aligned horizontally, each being opened frontward. The plurality of power-feed-cable lead-in ports 55 allow the plurality of electric wires 40a included in the power feed cable 40 to be drawn into the connection box 50 through the plurality of power-feed-cable lead-in ports 55, respectively. It is desirable that at least the power-feed-cable lead-in port 55 out of the connection box 50 is covered with the hydraulic pump cover 31 from above.

Figure 6:
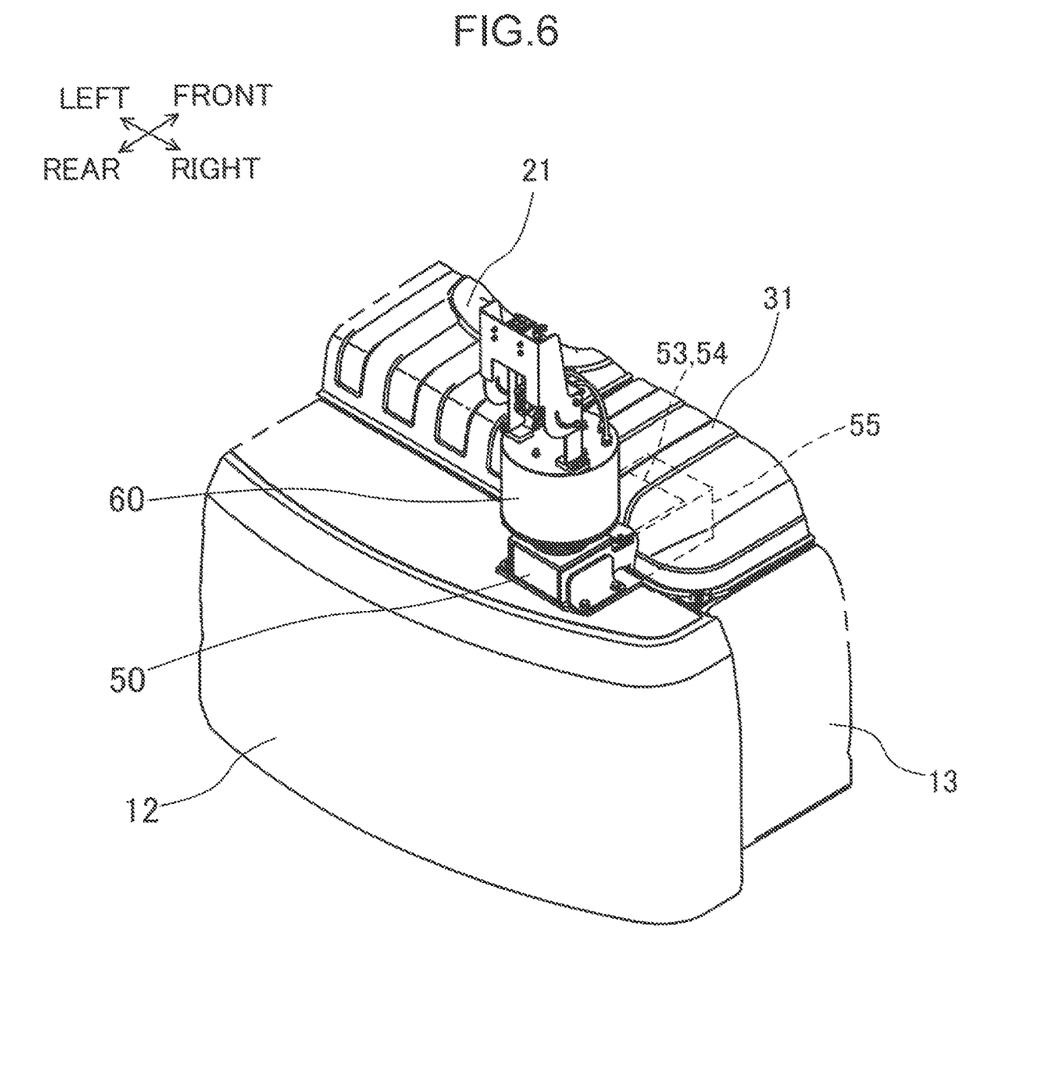
FIG. 6 is a perspective view of the rear of the machine body, showing the arrangement of the power receiving device and the connection box.

The connection box 50, disposed on the rear side of the hydraulic pump cover 31 as shown in FIG. 6, prevents the connection box 50 and the power receiving device 60 connected to the connection box 50 from overlapping the electric motor cover 21 longitudinally of the upper slewing body 11. On the other hand, in the connection box 50 according to the present embodiment, the region from the front end where the power-feed-cable lead-in ports 55 are provided to the connection opening 53 is covered with the hydraulic pump cover 31.

As shown in FIG. 5, the power receiving device 60 includes a support shaft 62, a plurality of conductive rings 64, a plurality of brushes 65, and a case 63.

The support shaft 62 has a lower end fixed to the upper end of the connection member 70, formed in a hollow cylindrical shape extending upward from the lower end. The plurality of conductive rings 64 are spaced axially of the support shaft 62 (vertically in FIG. 5) and fixed to the outer peripheral surface of the support shaft 62. The plurality of brushes 65 are attached to the conductive rings 64 capably of sliding circumferentially of the conductive rings 64 while keeping contact with respective outer peripheral surfaces of the plurality of conductive rings 64, respectively. On the other hand, the machine side end of the power supply cable 100 branches into a plurality of electric wires 100a, whose ends are connected to the plurality of brushes 65, respectively.

The plurality of connection wires 61 are connected to the plurality of conductive rings 64, respectively. Specifically, each of the plurality of connection wires 61 has a power-receiving side end connected to the corresponding one of the plurality of conductive rings 64 and a connection-side end which is the opposite end to the connection-side end and connected to the connection unit 52. The plurality of connection wires 61 are drawn into the connection box 50 from the plurality of conductive rings 64, respectively, through the inside of the support shaft 62 and the inside of the connection member 70.

The case 63 is supported on the connection member 70 capably of relative rotation to the support shaft 62 about the center axis of the support shaft 62 while accommodating the support shaft 62, the plurality of conductive rings 64 and the plurality of brushes 65. Specifically, the case 63 includes a bottom wall 63a, a peripheral wall 63b and a top wall 63c. The bottom wall 63a is formed in an annular shape enclosing the upper end of the connection member 70 and mounted on the connection member 70 so as to be rotatable along the outer peripheral surface of the upper end. The peripheral wall 63b stands up on the bottom wall 63a, having a cylindrical shape enclosing the support shaft 62, the plurality of conductive rings 64, and the plurality of brushes 65 on the radially outer side thereof. The top wall 63c is joined with the upper end of the peripheral wall 63b so as to cover the support shaft 62, the plurality of conductive rings 64 and the plurality of brushes 65 at the position on the upper side thereof. The plurality of electric wires 100a are drawn into the case 63 with vertical penetration through the top wall 63c.

The electric current output from the external power supply 200 flows to the plurality of brushes 65 through the plurality of electric wires 100a of the power supply cable 100, flowing from the plurality of brushes 65 to the plurality of connection wires 61 through the plurality of conductive rings 64, flowing from the plurality of connection wires 61 to the power feed cable 40 through the connection unit 52 in the connection box 50, and finally flowing from the power feed cable 40 to the electric motor 20 installed inside the upper slewing body 11 and a not-graphically-shown control board. Thus powered are the electric motor 20 and the like from the external power supply 200.

As described above, in the electric hydraulic excavator 1 which is an electric work machine according to the present embodiment, the connection unit 52 for connecting the power feed cable 40 extending from the plurality of connection wires 61 and the upper slewing body 11 extending from the power receiving device 60 to each other is accommodated in the connection box 50 provided in the top part of the counterweight 12, thereby being located at the position outside the power receiving device 60, specifically, the position away from the power receiving device 60 to allow a worker to easily access the connection unit 52. This frees a worker from the necessity of performing complicated connection work in the power receiving device 60, thus enabling the connection work to be performed more efficiently. Besides, the power receiving device 60 and the connection box 50 are allowed to be located not to hinder the work for maintenance of either of the electric motor 20, the hydraulic pump 30 and peripheral devices thereof. Furthermore, the hydraulic pump cover 31 covering a part of the connection box 50 enables the interior of the connection box 50 to be protected with a simple configuration.

Figure 7:
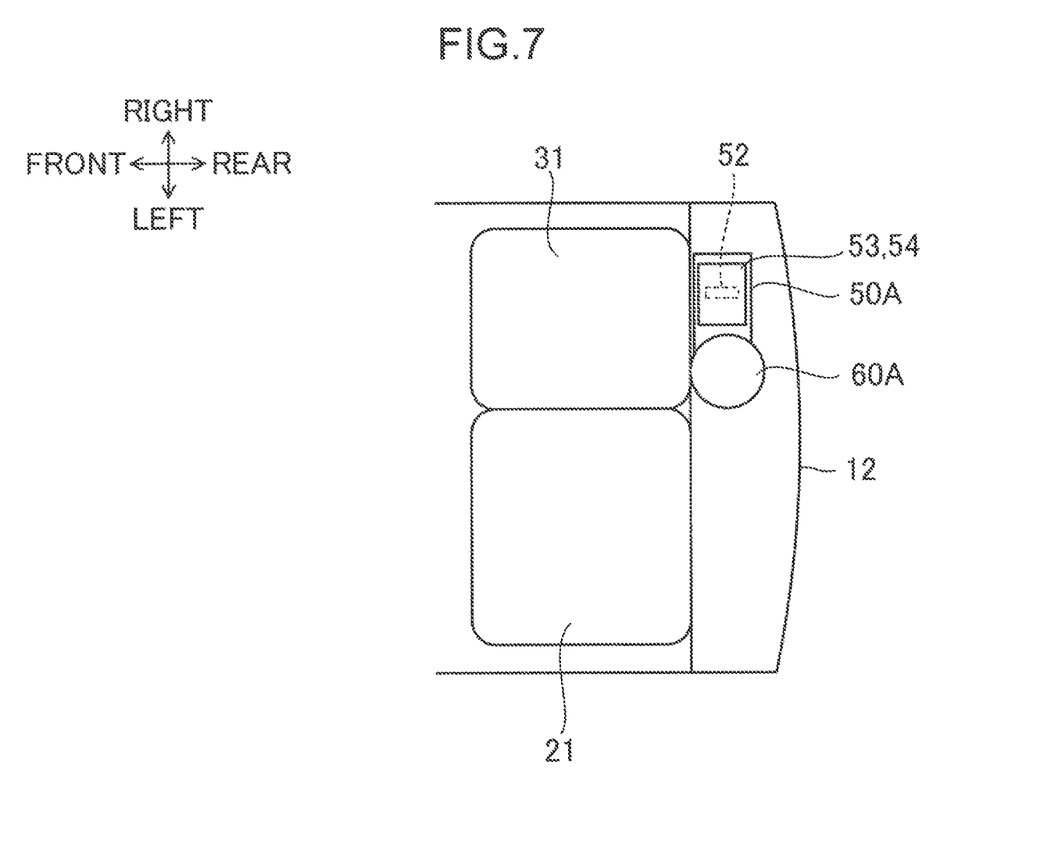
FIG. 7 is a plan view of a rear part of a machine body according to another embodiment.

FIG. 7 shows the rear of a machine body of an electric work machine according to another embodiment of the present invention. The embodiment includes a power receiving device 60A and a connection box 50A similarly to the aforementioned embodiment shown in FIGS. 1 to 6; however, the power receiving device 60A and the connection box 50A are aligned not longitudinally of the upper slewing body 11 but laterally thereof. The connection box 50A extends laterally of the upper slewing body 11 and is fixed to the upper part of the counterweight 12 so that the entire connection box 50A is laid on the counterweight 12. The power receiving device 60A is connected to the upper part of the connection box 50A so as to be laterally aligned with the connection box 50A. It is also possible that the power receiving device 60A is fixed to not the upper part of the connection box 50A but the upper part of the counterweight 12 and connected to the connection box 50A laterally.

Also in such other embodiment, the connection unit 52 interconnecting the plurality of connection wires extending from the power receiving device 60A and the power feed cable extending from the machine body can be located at a position in the connection box 50A, the position being away from the power receiving device 60A and allowing a worker to access the position, thereby allowing the wiring work to be rendered efficient. Besides, unlike the above embodiment shown in FIGS. 1 to 6, the connection box 50A extends laterally to be entirely laid on the counterweight 12, thus being prevented from protruding rearward beyond the rear surface of the upper slewing body 11 while prevented from interfering with the hydraulic pump cover 31 and the electric motor cover 21 that are on the front side of the connection box 50A. The connection box 50A can be disposed so as to allow the lid part 54 to be exposed upward of the counterweight 12 without being covered with the hydraulic pump cover 31, thereby allowing the connection unit 52 to be easier to access and enabling the workability to be improved with a simple configuration.

Although the hydraulic excavator 1 according to the embodiment is a large-size hydraulic excavator, the electric work machine according to the present invention is not limited thereto but allowed to be applied to, for example, a small turn type electric work machine. The power receiving device and the connection box can be disposed also on an arc-shaped counterweight that is included in a small swing type of electric work machine so as to cover the outer periphery of a machine room. The present invention, thus, can be applied regardless of the shape of counterweight.

Respective positions of the power receiving device and the connection unit according to the present invention are not limited on the counterweight. At least one of the power receiving device and the connection unit may be disposed, for example, on a part other than the counterweight in the machine body. Furthermore, the connection unit does not absolutely have to be accommodated in the connection box but only have to be disposed outside of the power receiving device. This allows the connection work to be easy.

As described above, there is provided an electric work machine including a machine body and a power receiving device and allowing connection work for interconnecting the power receiving device and a power feed cable that enables the machine body to be fed with power through the power feed cable to be efficiently performed.

The electric work machine is powerable through a power supply cable having a power-supply side end to be connected to an external power supply and a machine side end opposite to the power-supply side end. The electric work machine includes a machine body, a power receiving device, connection wires, a power feed cable, and a connection unit. The machine body includes an electric motor. The power receiving device is connected to the machine side end of the power supply cable to be supplied with power by the external power supply through the power supply cable. The connection wires are connected to the power receiving device to extend from the power receiving device toward the connection unit. The power feed cable is connected to the machine body to allow the machine body to be fed with power through the power feed cable. The connection unit is disposed outside the power receiving device and connects the connection wires extending from the power receiving device and the power feed cable extending from the machine body to each other.

In the electric work machine, the connection unit for interconnecting the machine body extending from the connection wires and the power feed cable extending from the power receiving device is disposed outside of the power receiving device, which allows a worker to access the connection unit easily and frees the worker from complicated connection work in the power receiving device. This enables the connecting work in the connection unit to be performed efficiently.

Preferably, the electric work machine further comprises a connection box that accommodates the connection unit, the connection box having an opening capable of being selectively opened and closed outside the power receiving device to allow the connection unit to be exposed to the outside of the connection box through the opening. The connection box, while accommodating the connection unit to protect it, enables a worker to easily view the connection unit from the outside of the connection box through the opening, thereby allowing the connection work for interconnecting the power feed cable and the connection wires to be efficiently performed. On the other hand, with closing the openable and closable opening, the connection unit can be protected more reliably.

In the case where the machine body includes a counterweight located in a rear part of the machine body, it is preferable that the connection box is located outside the counterweight and fixed to an upper part of the counterweight. The thus disposed connection box allows a worker to more easily access the connection unit through the opening of the connection box.

Preferably, the machine body further includes an electric motor cover that covers the electric motor capably of opening and closing the electric motor in the upper side of the electric motor, the power receiving device and the connection box located not to overlap the electric motor cover longitudinally of the machine body. This prevents the power receiving device and the connection box from hindering the electric motor cover from being opened and closed, thereby enabling an operation of opening the electric motor cover for the maintenance of the electric motor and the peripheral equipment thereof to be smoothly performed.

It is preferable that the machine body further includes a hydraulic pump aligned with the electric motor laterally of the machine body on a front side of the counterweight, and a hydraulic pump cover that covers the hydraulic pump at an upper side of the hydraulic pump, the hydraulic pump cover, the connection box and the power receiving device being aligned in this order longitudinally of the machine body. This arrangement enables both the connection wires that are drawn from the power receiving device into the connection box and the power feed cable drawn from the connection box to the inside of the hydraulic pump cover to be easily disposed.

It is preferable: the connection box extends from the counterweight toward the hydraulic pump cover; the connection box is provided with a power-feed-cable lead-in port, which is formed so as to allow the power feed cable to be drawn into the connection box through the power-feed-cable lead-in port; and the hydraulic pump cover covers at least the power-feed-cable lead-in port out of the connection box on an upper side of the power-feed-cable lead-in port. The connection box, disposed so as to extend toward the hydraulic pump cover located on the front side of the connection box, can be restrained from projecting rearward of the machine body. Besides, the connection box, which extends toward the hydraulic pump cover to allow at least the power-feed-cable lead-in port of the connection box to be covered with the hydraulic pump cover, reduces the necessity of applying fine waterproofing to the power feed cable, for example, allowing the power feed cable to be waterproofed only by the seal of the connection box. This enables the power feed cable to be protected with a simple configuration, thereby allowing both the waterproof and assembly performances to be enhanced.

Preferably, the connection box has a front end formed with the power-feed-cable lead-in port, the front end being located under the hydraulic pump cover and on a rear side of the hydraulic pump. This prevents the connection box from hindering the maintenance operation of the hydraulic pump, while restraining water from entering the connection box.

The opening of the connection box is, preferably, opened upward at a position where the opening is prevented from vertical overlap with the power receiving device. The opening, which is opened upward at a position horizontally deviated from the power receiving device, enables the connection unit to be viewed by a worker more easily through the opening, thereby enabling the connection work for interconnecting the power feed cable and the connection wires to be performed more efficiently.

This application is based on Japanese Patent application No. 2021-101732 filed on Jun. 18, 2021 in Japan Patent Office, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An electric work machine capable of being powered through a power supply cable having a power-supply side end to be connected to an external power supply and a machine side end opposite to the power-supply side end, the electric work machine comprising:
 a machine body including an electric motor;
 a power receiving device connectable to the machine side end of the power supply cable to be supplied with power by the external power supply through the power supply cable, the power receiving device including a plurality of conductive rings and a plurality of brushes that are attached to the conductive rings configured for sliding in a circumferential direction of the conductive rings while keeping contact with respective outer peripheral surfaces of the conductive rings;
 connection wires connected to the power receiving device to extend from the power receiving device;
 a power feed cable connected to the machine body to allow the machine body to be fed with power through the power feed cable;
 a connection unit that connects the connection wires extending from the power receiving device and the power feed cable extending from the machine body to each other, the connection unit being disposed outside the power receiving device; and
 a connection box that accommodates the connection unit, the connection box having an opening configured to be selectively opened and closed outside the power receiving device to allow the connection unit to be exposed to the outside of the connection box through the opening.

2. The electric work machine according to claim 1, wherein the machine body includes a counterweight located in a rear part of the machine body, and the connection box is located outside the counterweight and fixed to an upper part of the counterweight.

3. The electric work machine according to claim 2, wherein the machine body includes an electric motor cover that covers the electric motor and is capable of opening and closing a machine room accommodating the electric motor, the power receiving device and the connection box being located so as to be prevented from overlap with the electric motor cover when viewed from above the machine body.

4. The electric work machine according to claim 2, wherein the machine body further includes a hydraulic pump aligned with the electric motor laterally of the machine body on a front side of the counterweight, and a hydraulic pump cover that covers the hydraulic pump on an upper side of the hydraulic pump, the hydraulic pump cover, the connection box and the power receiving device being aligned in this the order of the hydraulic pump cover, the connection box and the power receiving device longitudinally of the machine body when viewed from above the machine body.

5. The electric work machine according to claim 4, wherein: the connection box extends from the counterweight toward the hydraulic pump cover; the connection box is provided with a power-feed-cable lead-in port, which is formed so as to allow the power feed cable to be drawn into the connection box through the power-feed-cable lead-in port; and the hydraulic pump cover covers at least the power-feed-cable lead-in port out of the connection box on an upper side of the power-feed-cable lead-in port.

6. The electric work machine according to claim 5, wherein the connection box has a front end formed with the power-feed-cable lead-in port, the front end being located under the hydraulic pump cover and on a rear side of the hydraulic pump.

7. The electric work machine according to claim 2, wherein the opening of the connection box is opened upward at a position where the opening is prevented from vertical overlap with the power receiving device.

8. An electric work machine powered through a power supply cable having a power-supply side end to be connected to an external power supply and a machine side end opposite to the power-supply side end, the electric work machine comprising:
- a machine body including an electric motor;
- a power receiving device connectable to the machine side end of the power supply cable to be supplied with power by the external power supply through the power supply cable;
- connection wires connected to the power receiving device to extend from the power receiving device;
- a power feed cable connected to the machine body to allow the machine body to be fed with power through the power feed cable;
- a connection unit that connects the connection wires extending from the power receiving device and the power feed cable extending from the machine body to each other, the connection unit being disposed outside the power receiving device; and
- a connection box that accommodates the connection unit, the connection box having an opening able to be selectively opened and closed outside the power receiving device to allow the connection unit to be exposed to the outside of the connection box through the opening,
- wherein the machine body includes a counterweight located in a rear part of the machine body, and the connection box is located outside the counterweight and fixed to an upper part of the counterweight,
- the machine body further includes a hydraulic pump aligned with the electric motor laterally of the machine body on a front side of the counterweight, and a hydraulic pump cover that covers the hydraulic pump on an upper side of the hydraulic pump, the hydraulic pump cover, the connection box and the power receiving device being aligned in the order of the hydraulic pump cover, the connection box and the power receiving device longitudinally of the machine body when viewed from above the machine body, the connection box extends from the counterweight toward the hydraulic pump cover;
- the connection box is provided with a power-feed-cable lead-in port, which is formed so as to allow the power feed cable to be drawn into the connection box through the power-feed-cable lead-in port; and the hydraulic pump cover covers at least the power-feed-cable lead-in port of the connection box on an upper side of the power-feed-cable lead-in port.

9. The electric work machine according to claim 8, wherein the connection box has a front end formed with the power-feed-cable lead-in port, the front end being located under the hydraulic pump cover and on a rear side of the hydraulic pump.

* * * * *